United States Patent
Wolf et al.

(10) Patent No.: US 11,572,031 B2
(45) Date of Patent: Feb. 7, 2023

(54) BELT GUIDE DEVICE FOR A PASSENGER RESTRAINT BELT OF A MOTOR VEHICLE

(71) Applicant: ILLINOIS TOOL WORKS INC., Glenview, IL (US)

(72) Inventors: Matthias Wolf, Creglingen (DE); Jochen Beck, Creglingen (DE); Viviane Reibel, Creglingen (DE)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 0 days.

(21) Appl. No.: 17/323,390

(22) Filed: May 18, 2021

(65) Prior Publication Data

US 2021/0362671 A1 Nov. 25, 2021

(30) Foreign Application Priority Data

May 19, 2020 (DE) ...................... 10 2020 113 571.8
May 7, 2021 (DE) ...................... 10 2021 111 989.8

(51) Int. Cl.
*B60R 22/18* (2006.01)

(52) U.S. Cl.
CPC ...... *B60R 22/18* (2013.01); *B60R 2022/1818* (2013.01)

(58) Field of Classification Search
CPC .................. B60R 22/18; B60R 2022/1818
See application file for complete search history.

(56) References Cited

U.S. PATENT DOCUMENTS

| | | | |
|---|---|---|---|
| 6,520,588 B1 | 2/2003 | Busch | |
| 10,196,033 B2* | 2/2019 | Loew | B60R 22/20 |
| 2007/0187939 A1* | 8/2007 | Latour | B60R 22/18 297/483 |
| 2009/0078811 A1* | 3/2009 | Dick | B60R 22/18 242/397 |
| 2013/0069356 A1* | 3/2013 | You | B60R 22/24 280/801.1 |
| 2017/0369029 A1* | 12/2017 | Loew | B60R 22/20 |
| 2019/0061680 A1* | 2/2019 | Wang | B60R 22/18 |
| 2021/0378366 A1* | 12/2021 | Ziv | A44B 11/2561 |
| 2022/0055571 A1* | 2/2022 | Sbongk | B60R 22/24 |

FOREIGN PATENT DOCUMENTS

| | | |
|---|---|---|
| DE | 202017104232 U1 | 8/2017 |
| DE | 102020002900 A1 | 9/2020 |
| WO | WO 2021071818 A1 | 4/2021 |
| WO | WO 2021071998 A1 | 4/2021 |

* cited by examiner

*Primary Examiner* — Toan C To
(74) *Attorney, Agent, or Firm* — Thompson Hine LLP

(57) ABSTRACT

A seat belt guide device for a passenger restraint belt of a motor vehicle is provided, wherein the seat belt guide device includes a fastening device with at least one spring-actuated catching device, with which the seat belt guide device can be snap-fitted or fastened to a motor vehicle in an assembly direction, wherein the seat belt guide device is preferably molded from at least one plastic injection.

11 Claims, 13 Drawing Sheets

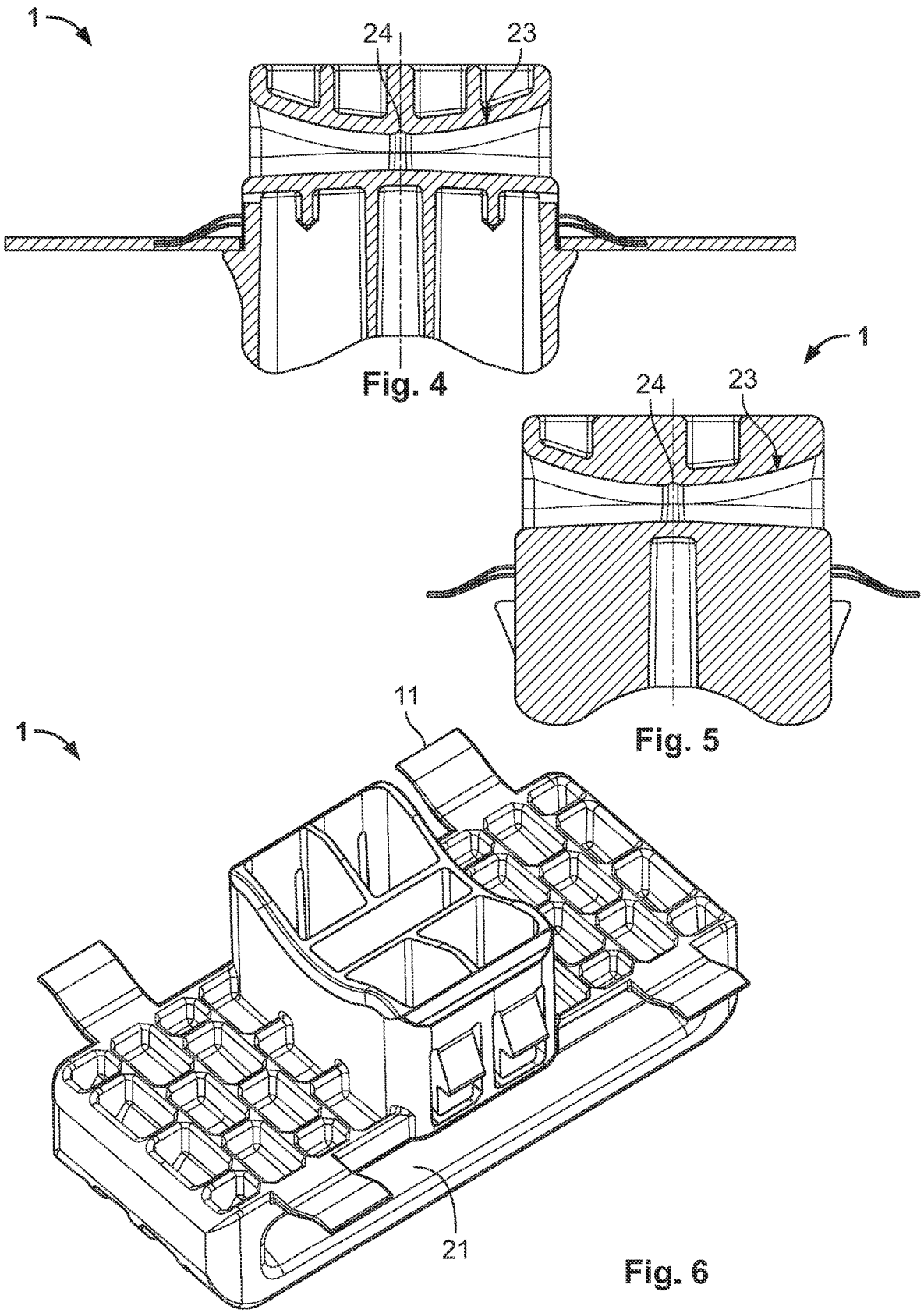

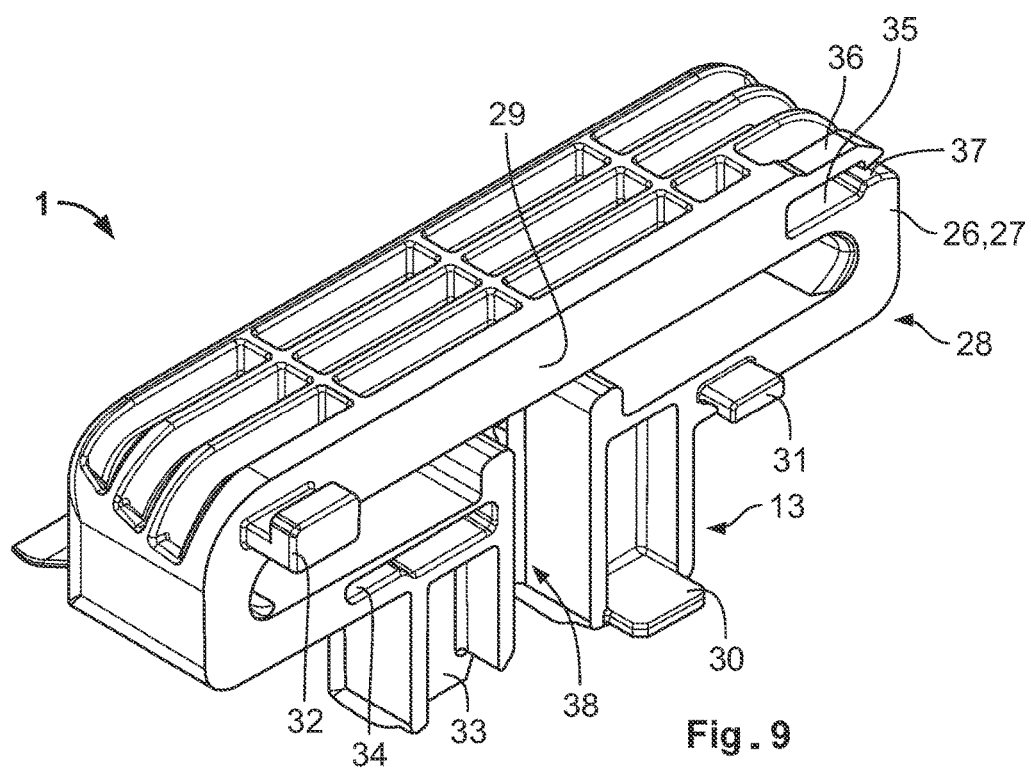
Fig. 9
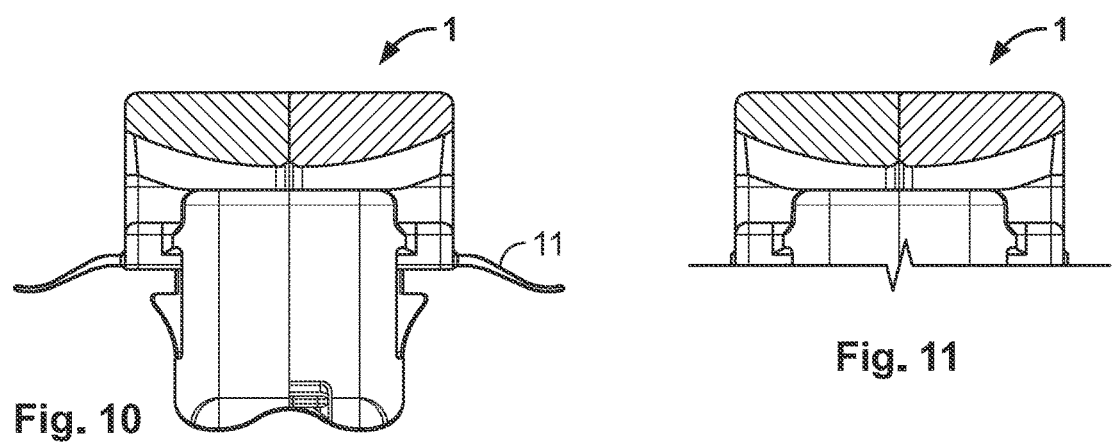
Fig. 10
Fig. 11
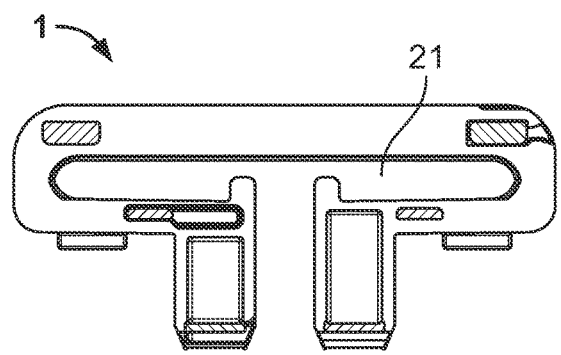
Fig. 12
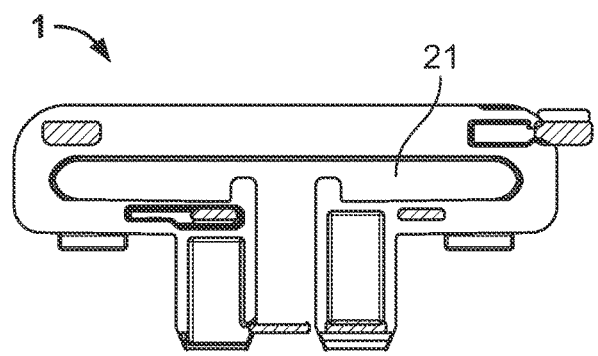
Fig. 13

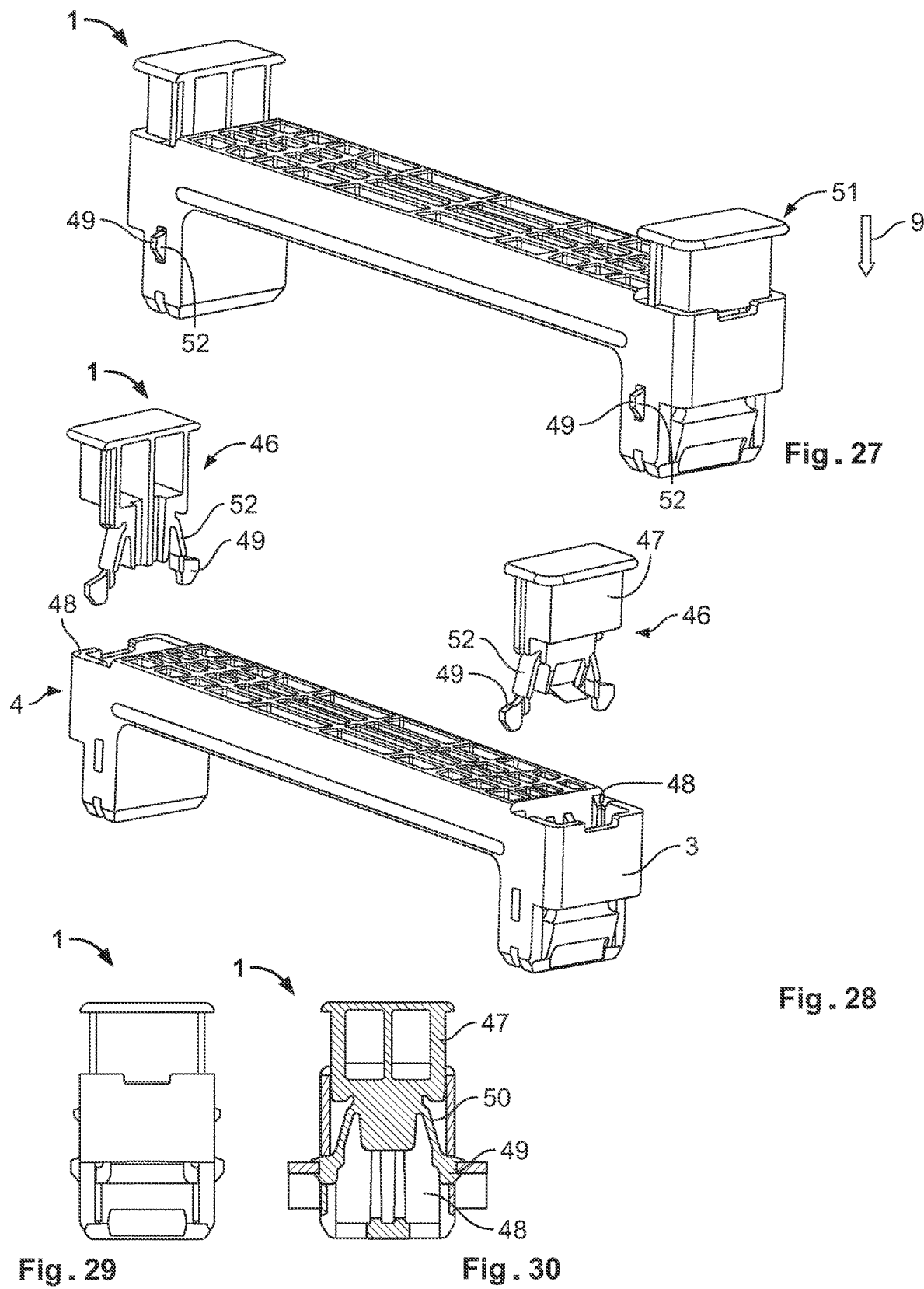

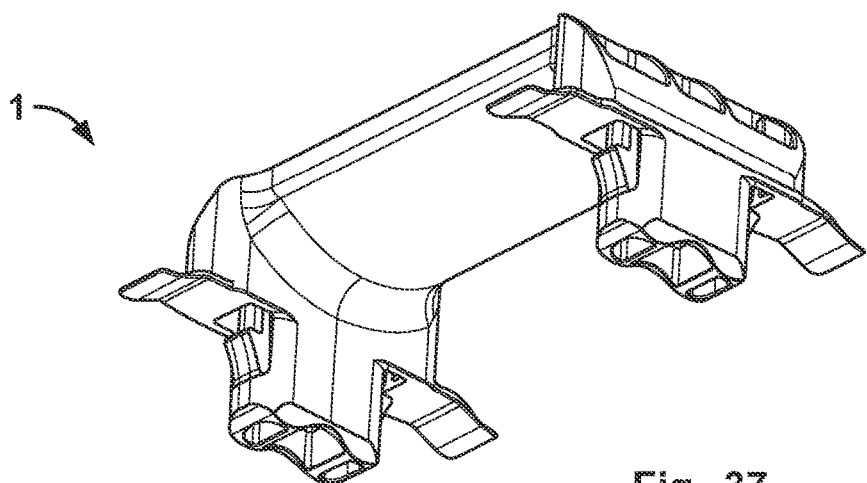
Fig. 37
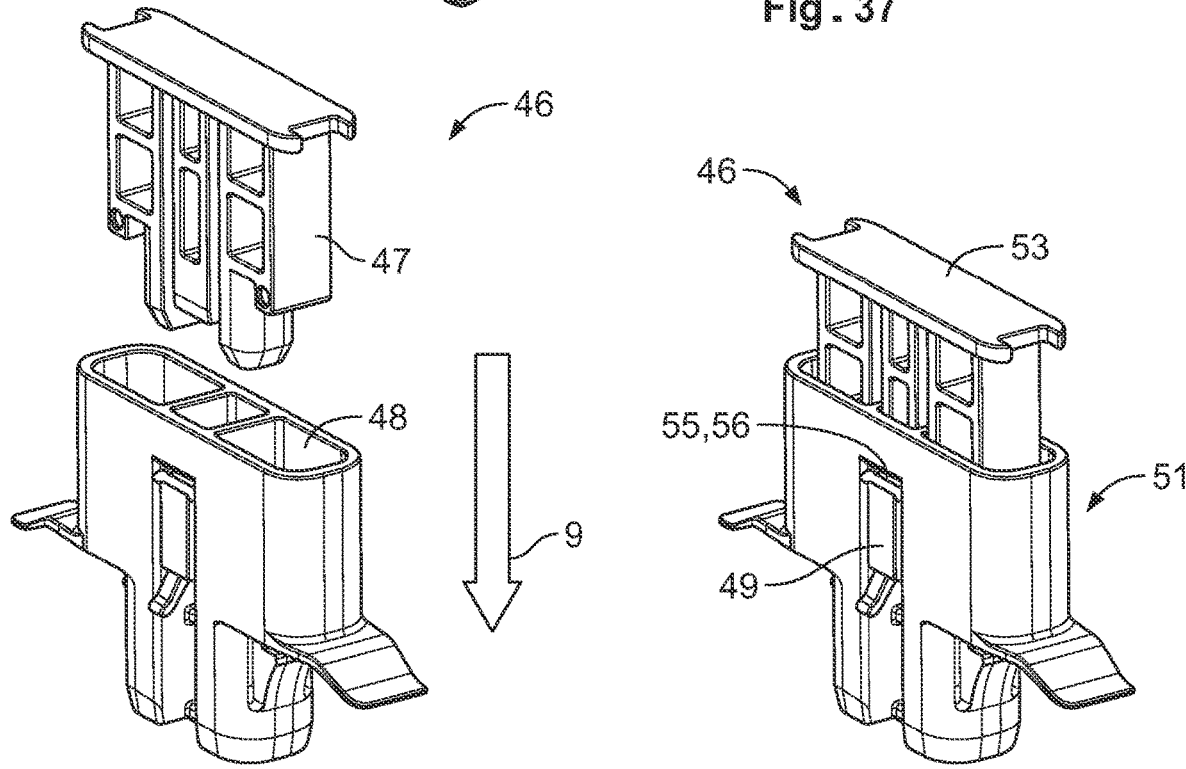
Fig. 38
Fig. 39
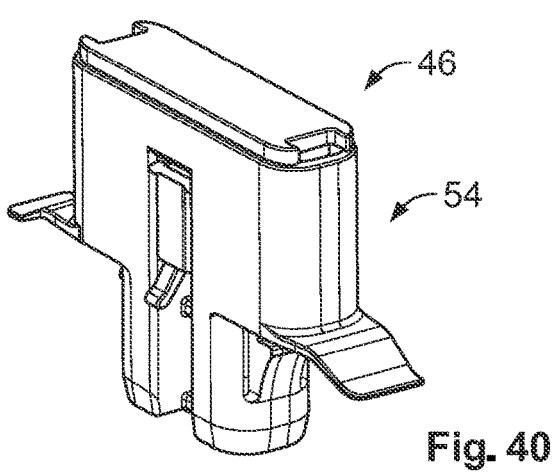
Fig. 40

BELT GUIDE DEVICE FOR A PASSENGER RESTRAINT BELT OF A MOTOR VEHICLE

TECHNICAL FIELD

The present invention relates to a belt guide device for a passenger restraint belt of a motor vehicle.

BACKGROUND

A seat belt is a restraint system in motor vehicles, aircraft, and other means of transportation. In the event of vehicle deceleration caused by accident situations, the vehicle occupants are then restrained by stable belts connected to the vehicle body and thus cannot be flung around within or even out of the vehicle.

A three-point harness includes for example, buckle, latch, and the harness and retract mechanism. In addition, there are the deflectors (seat belt guide device) and the end fitting. To don the seat belt, also called buckling up, the end piece (latch) of the harness provided for this purpose is inserted into a buckle and engages therein. The harness comprises about 300 filaments which, when interwoven, yield a belt measuring 46 to 48 millimeters in width and 1.2 millimeters in thickness. The individual filaments in turn are spun from about 100 polyester fibers that are about twice as thick as a human hair.

An object of the present invention is to provide a deflector or a seat belt guide device that ensures safe and reliable operation.

A further object of the present invention is to provide an alternative to known seat belt guide devices.

In addition, it is an object of the present invention to provide a seat belt guide device that is simple and/or inexpensive to manufacture.

Yet another object of the present invention is to provide an improved seat belt guide device compared to the prior art.

SUMMARY

The objects are achieved by the features of the independent claim 1. Advantageous embodiments are specified in the dependent claims thereto.

According to the present invention, a seat belt guide device for a passenger restraint belt of a motor vehicle is provided, wherein the seat belt guide device comprises a fastening device with at least one catching device or a spring-actuated catching device, with which the seat belt guide device can be snap-fitted or attached in an assembly direction on a motor vehicle, wherein the seat belt guide device comprises a guide device having a guide recess for guiding a passenger restraint belt, wherein the width of the guide recess—in particular orthogonally or transversely to the mounting direction—corresponds at least to the width of a passenger restraint belt (overall width), and wherein the seat belt guide device is injection molded from at least one plastic.

From the prior art, seat belt guide devices or deflectors or seat belt guides are known that for example comprise a metal rod that can be attached to a carrier component of a motor vehicle with two weld nuts and two screws.

Because the seat belt guide device according to the invention is injection molded from a plastic and/or is manufactured by means of a plastic injection molding method, the latter has significant advantages in terms of production costs over the currently used massproduced parts made of metal.

Accordingly, the seat belt guide device according to the invention is significantly cheaper and yet safe and reliable to operate.

Such a seat belt guide device is often arranged in the area of the B pillar of a motor vehicle and is formed to define an upper deflection point of a passenger restraint belt and accordingly to position and guide the passenger restraint belt, in particular in the event of an accident.

A corresponding force absorbed at the deflection point in an accident or the restraining force of the seat belt guide devices on the carrier component or the B pillar must be at least 1500 Newtons. Accordingly, the seat belt guide device can be formed to absorb at least a force of greater than 1500 Newtons and, in particular, greater than 1600 Newtons.

An assembly force that must be exerted to secure the seat belt guide device to a carrier component of a motor vehicle via the fastening device can be about 100 Newtons and is preferably less than 100 Newtons.

In particular, such a seat belt guide device prevents a transfer of force via the harness to internal trim elements of a motor vehicle, in particular in the area of the B pillar.

The mounting wall faces in an assembly direction. In the context of the present invention, the assembly direction is understood to mean a direction in which the seat belt guide device is attachable to a carrier component, wherein the assembly direction extends orthogonally to a corresponding surface of the carrier component to which the seat belt guide device is to be attached.

The fastening device can comprise a second catching device, wherein the first and the second catching device and the guide device are arranged one behind the other in assembly direction and at least partially and preferably completely overlapping one another in a direction transverse to the assembly direction.

Because the first and/or the second spring-actuated catching device of the fastening device and the guide device are arranged one behind the other in assembly direction and at least partially overlapping in a direction transverse to the assembly direction, the seat belt guide device according to the invention requires a very small installation space compared to seat belt guide devices known from the prior art, in particular transversely to the assembly direction.

In the area of the B pillar and also due to the vehicle design, the installation space is often greatly limited in the assembly direction and also transverse to the assembly direction in the area of the B pillar of newer vehicles.

The guide device can comprise a guide surface outlining the guide recess on which a passenger restraint belt is slidably supported or guided, wherein a fabricated recess is formed in the guide surface that extends parallel to the width of the guide recess.

Because a fabricated recess is provided, no manufacturing or production-related damage, such as protruding edges or burrs can occur in the area of the guide surface due to the use of slide tools. This enables safe and reliable and in particular damage-free operation (deflecting and positioning) of a seat belt via the guide surface.

The guide recess of the guide device can be formed as a closed ring.

When manufacturing a seat belt system, the manufacturers of seat belt systems can then insert a seat belt or passenger restraint belt into such a guide recess of the seat belt guide device. The complete seat belt system can then be delivered in its entirety to a customer without losing the seat belt guide device.

A clearance that terminates in the guide recess of the guide device can be formed between the first spring-actuated catching device and the second spring-actuated catching device, wherein a passenger restraint belt can be inserted through said clearance into the guide recess via a longitudinal edge of a passenger restraint belt.

In this way, a threading or insert aid is provided so that while the seat belt guide device can be connected to same by a supplier of a seat belt, the belt guide device can also be used flexibly because it is possible at any time to insert the seat belt into or to remove it from the guide recess of the guide device via the clearance terminating in the guide device. This is for example also possible in a fully assembled state in a motor vehicle.

The seat belt guide device is preferably formed integrally, e.g. as a single component.

Because the seat belt guide device is formed integrally, the material costs are low and the seat belt guide device can preferably be produced simply and cost-efficiently in one manufacturing step by means of an injection molding method.

The seat belt guide device can be formed from two parts that can be mated or pushed together via connection structures.

In this way, a corresponding injection molding process is extremely simplified because only a minimum number of slide tools are necessary and no undercuts are provided on the component.

The two parts of the seat belt guide device are preferably formed identically and have connection structures that are formed complementary or appropriately corresponding to each other.

In this way, the two components are easily and reliably connectable to one another. In addition, it is only necessary to provide a single component in order to form the corresponding seat belt guide device from two of these components.

The edges of the first and the second part that form the seat belt guide device can be formed rounded or chamfered in a connection region of the two parts where they contact each other in the mated or pushed together state.

By ensuring that no edges or burrs are formed in the connection region, a safe and reliable and in particular damage-free operation (deflection and positioning) of a seat belt is possible.

The seat belt guide device comprises spring elements to exert a force on the belt guide device in the assembled state acting in a direction opposite to the assembly direction.

By exerting a force on the seat belt guide device—and thus on the catching device of the fastening device—that acts in a direction opposite to the assembly direction, a mechanical play of the seat belt guide device with respect to a carrier component is reduced and the seat belt guide device is then connected to a motor vehicle nearly free of mechanical play.

Moreover, this nearly rules out that the catching device detaches from a corresponding through-opening of a carrier component.

In addition, the seat belt guide device, in particular the fastening device, can comprise an assembly verification device.

By providing an assembly verification device, it is ensured that the seat belt guide device can be securely and reliably assembled on a carrier component of a motor vehicle, in particular on a B pillar, via the, preferably four, spring-actuated catching devices of the fastening device.

Accordingly, the assembled state is easily and reliably determined to be secure via the assembly verification device.

BRIEF DESCRIPTION OF THE DRAWINGS

The present invention is now described hereinafter in more detail based on various embodiments and based on a plurality of exemplary embodiments shown in the figures. The technical features of the embodiments of the present invention and their exemplary embodiments are disclosed in the figures, which show in FIG. 1 a perspective illustration of a first exemplary embodiment of a first embodiment of a seat belt guide device according to the invention, FIG. 2 a side view of the seat belt guide device, FIG. 3 a top view from above onto the seat belt guide device, FIG. 4 a side cross-sectional illustration of the seat belt guide device in a state as-assembled in a carrier component, FIG. 5 a further side cross-sectional illustration of the seat belt guide device, FIG. 6 a further perspective illustration of the seat belt guide device, FIG. 7 a perspective illustration of a second exemplary embodiment of the seat belt guide device according to the invention according to the first embodiment, FIG. 8 a further perspective illustration of the seat belt guide device in a partially separated state, FIG. 9 a perspective illustration of a first part of the seat belt guide device, FIG. 10 a side cross-sectional illustration of the seat belt guide device, FIG. 11 a further side cross-sectional illustration of the seat belt guide device, FIG. 12 a side view of the seat belt guide device in the assembled state, FIG. 13 a side view of the seat belt guide device in the not assembled state, FIG. 14 a side view of a part of the seat belt guide device, FIG. 15 a side view of the seat belt guide device, FIG. 16 a top view from below onto the seat belt guide device, FIG. 17 a top view from above onto the seat belt guide device, FIG. 18 a perspective illustration of a third exemplary embodiment of the seat belt guide device according to the invention according to a second embodiment, FIG. 19 a side view of the seat belt guide device, FIG. 20 a further side view of the seat belt guide device, FIG. 21 a side cross-sectional illustration of the seat belt guide device, FIG. 22 a perspective view of the seat belt guide device in a state assembled in a carrier component, FIG. 23 a perspective view of the seat belt guide device with a separate guide surface device, FIG. 24 a side view of the seat belt guide device, FIG. 25 a side cross-sectional illustration of the seat belt guide device, FIG. 26 a further side cross-sectional illustration of the seat belt guide device, FIG. 27 a perspective view of a seat belt guide device in a home position according to a fourth exemplary embodiment of the second embodiment, FIG. 28 a perspective exploded illustration of the seat belt guide device, FIG. 29 a side view of the seat belt guide device, FIG. 30 a side cross-sectional illustration of the seat belt guide device, FIG. 31 a further side cross-sectional illustration of the seat belt guide device, FIG. 32 a perspective illustration of the seat belt guide device in a final assembly position, FIG. 33 a perspective illustration of a fifth exemplary embodiment of the seat belt guide device according to the invention according to the second embodiment, FIG. 34 a side view of the seat belt guide device, FIG. 35 a top view from below onto the seat belt guide device, FIG. 36 a top view from above onto the seat belt guide device, FIG. 37 a further perspective illustration of the seat belt guide device, FIG. 38 an exploded illustration of an embodiment of an assembly verification device, FIG. 39 a perspective illustration of the assembly verification device in a home position, FIG. 40 a perspective illustration of the assembly verification device in a final assembly position, FIG. 41 a side cross-sectional illustration of a further exemplary embodiment of the assembly verification device, FIG. 42 a side cross-sectional illustration of the assembly verification device in a home position, FIG. 43 a side cross-sectional illustration of the assembly verification device in an interim position, FIG. 44 a side cross-sectional illustration of the assembly verification device in a final assembly position, FIG. 45 a further embodiment of an assembly verification device, FIG. 46 a side cross-sectional illustration of the assembly verification device in a home position, FIG. 47 a side cross-sectional illustration of the assembly verification device in an interim position, and FIG. 48 a side cross-sectional illustration of the assembly verification device in a final assembly position.

DETAILED DESCRIPTION

Figure 1:
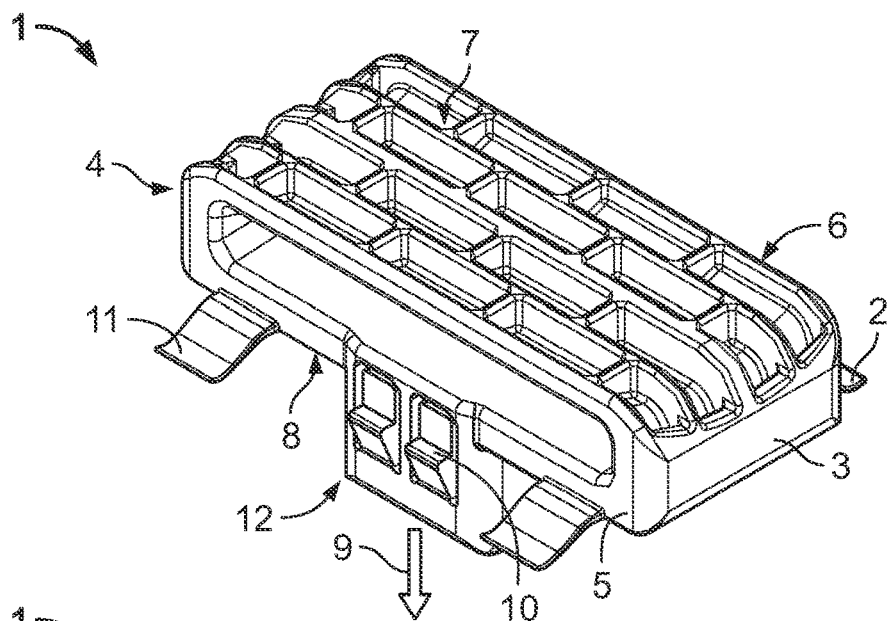
Figure 2:
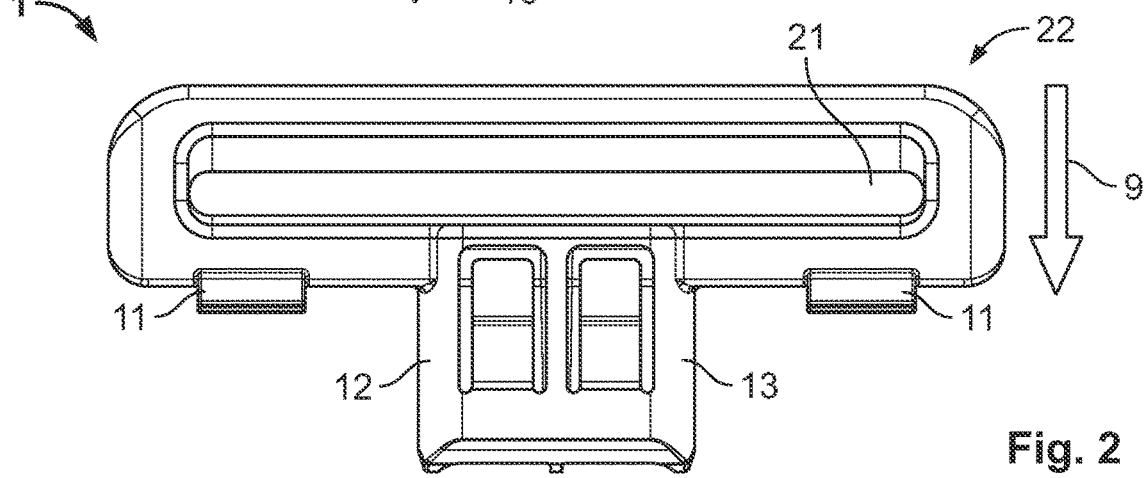
Figure 3:
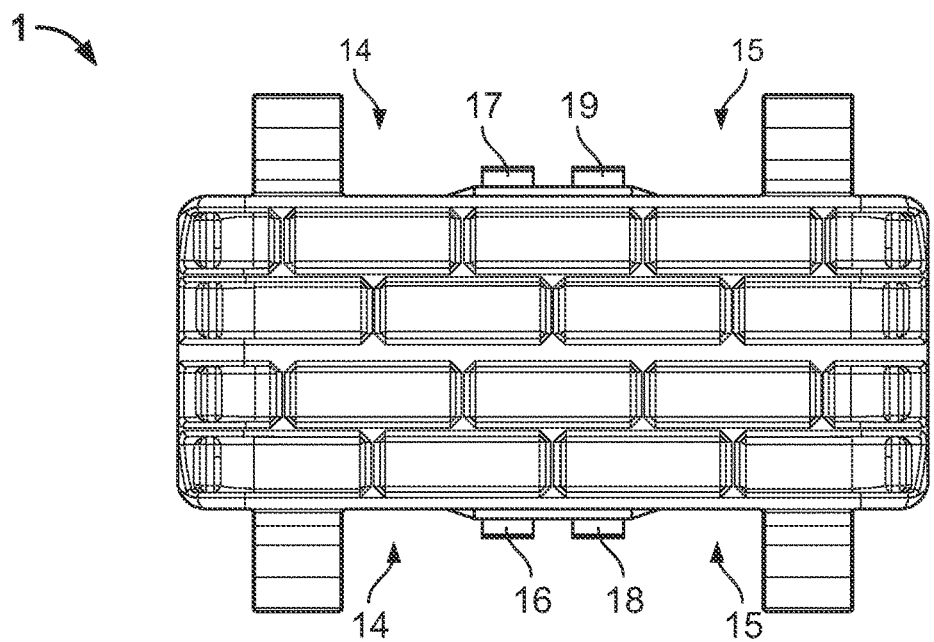
Figure 7:
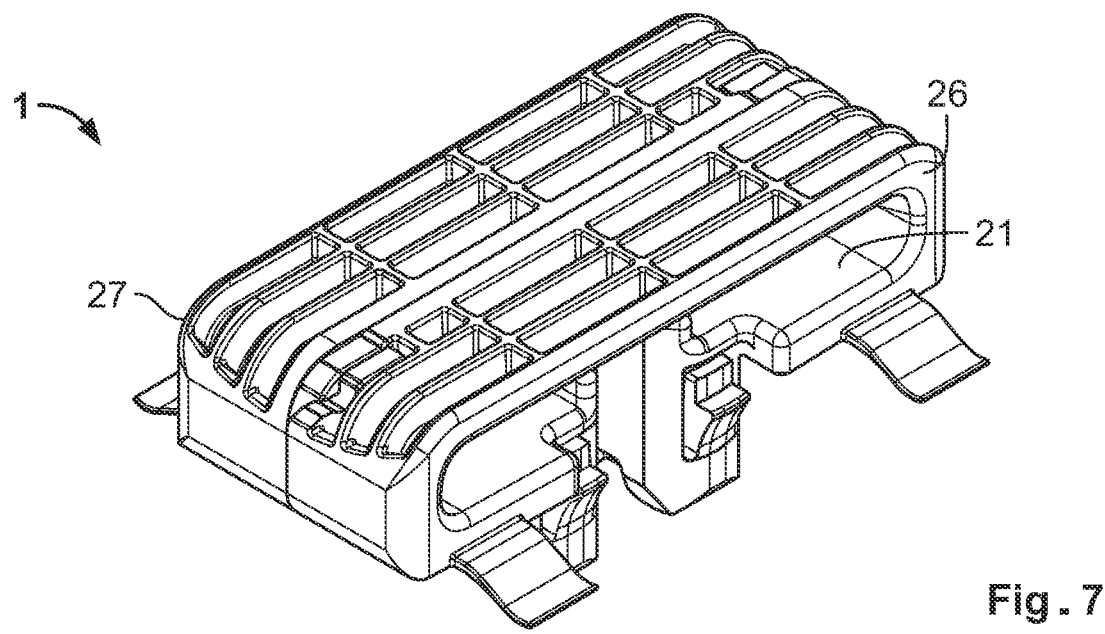
Figure 8:
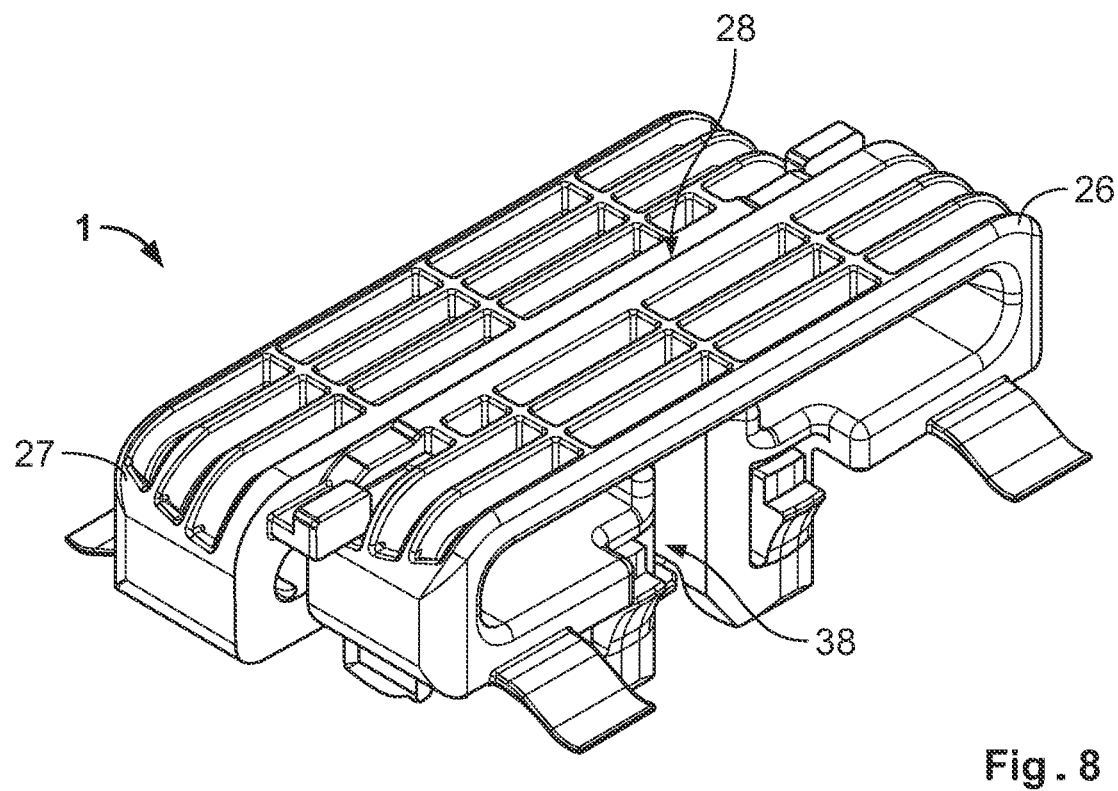
Figure 14:
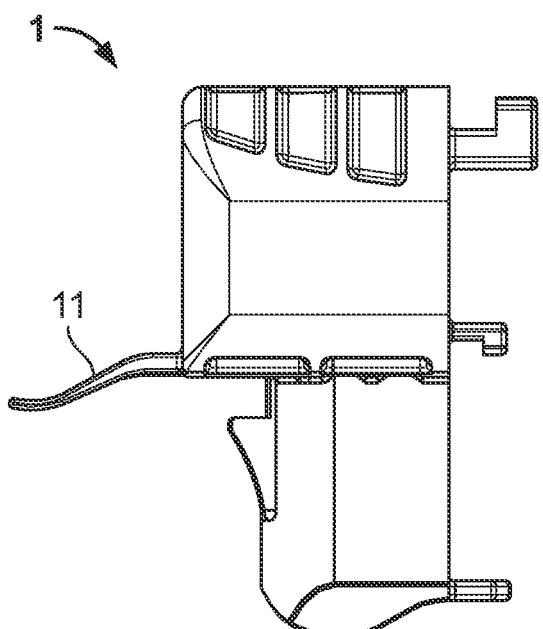
Figure 15:
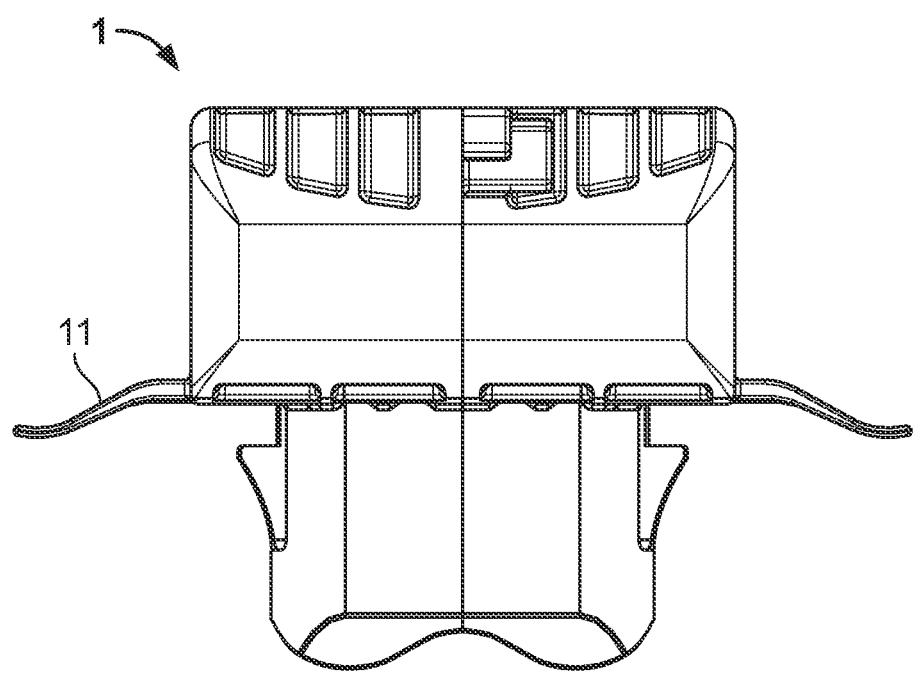
Figure 16:
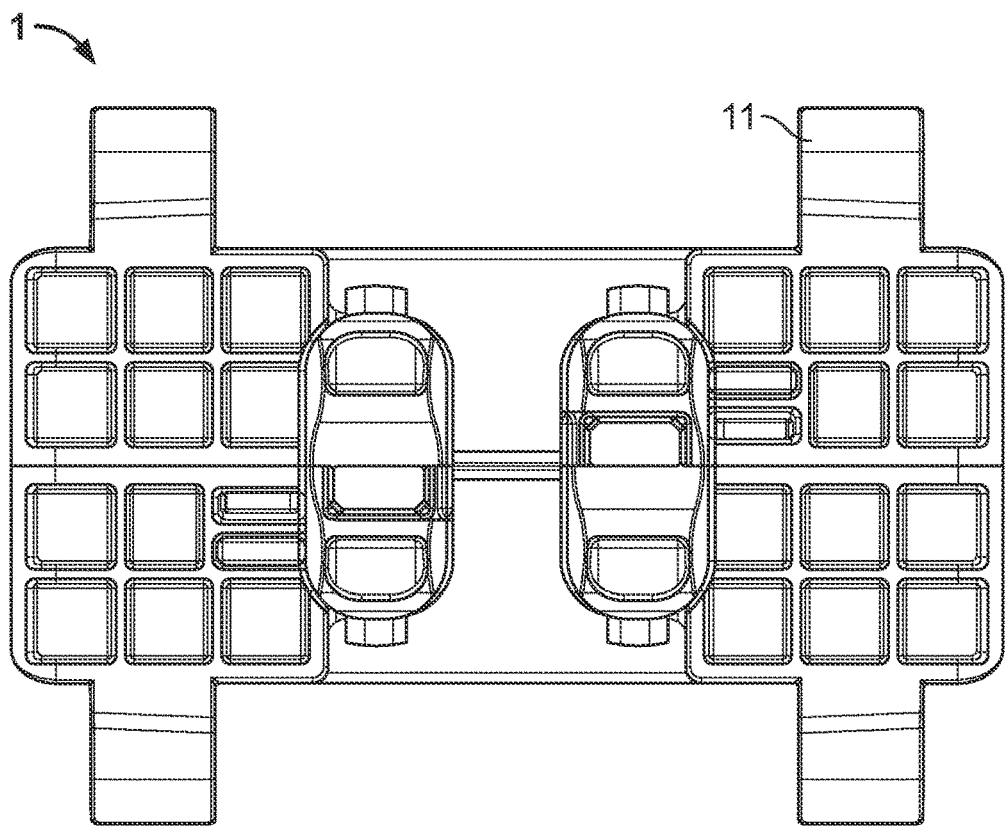
Figure 17:
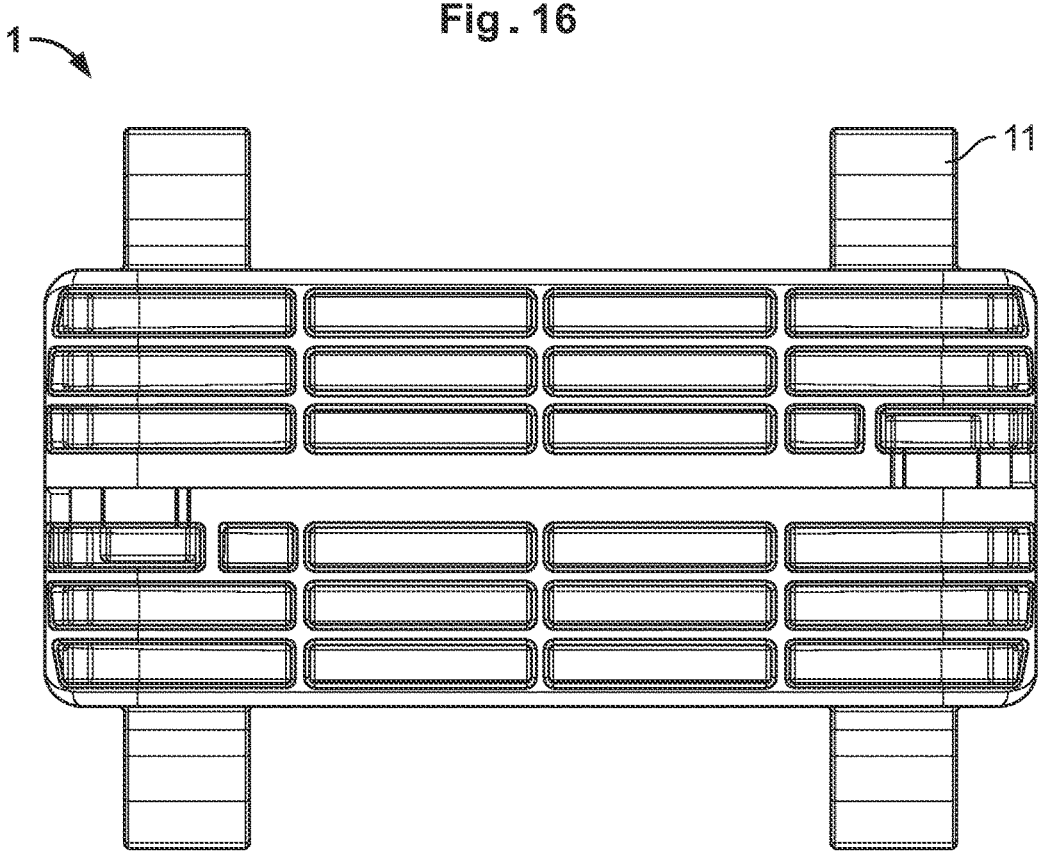
Figure 18:
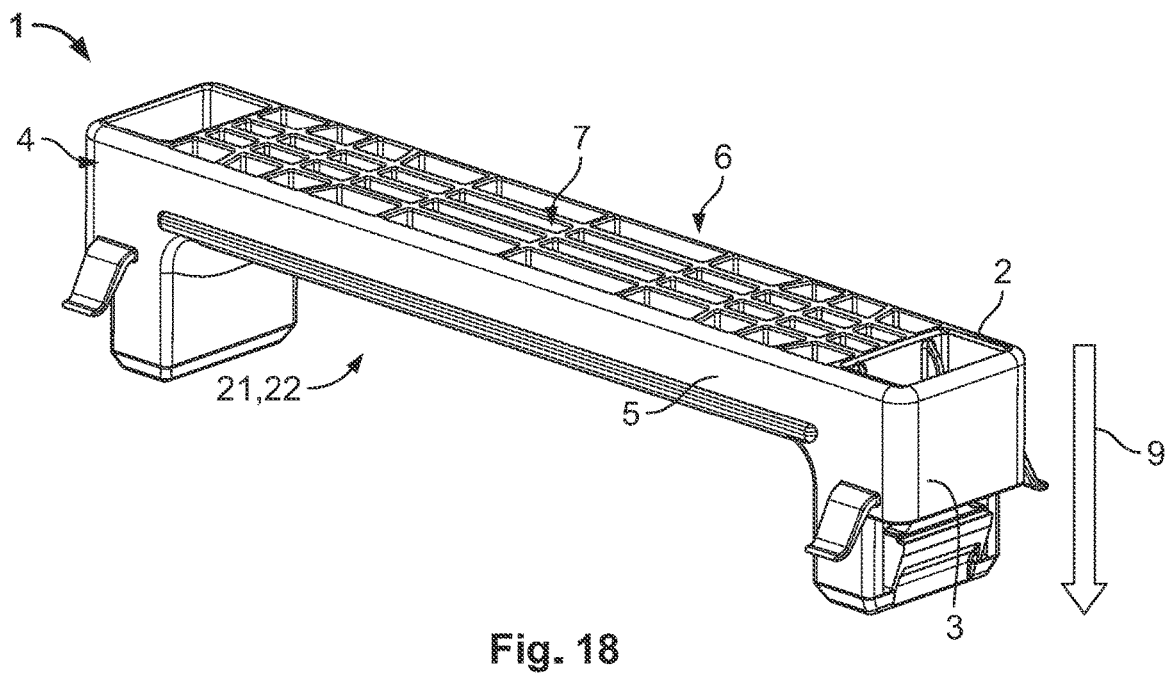
Figure 19:
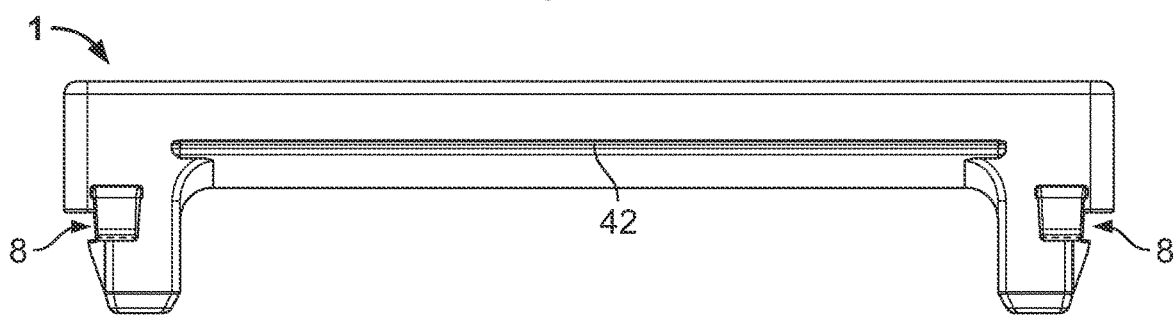
Figure 20:
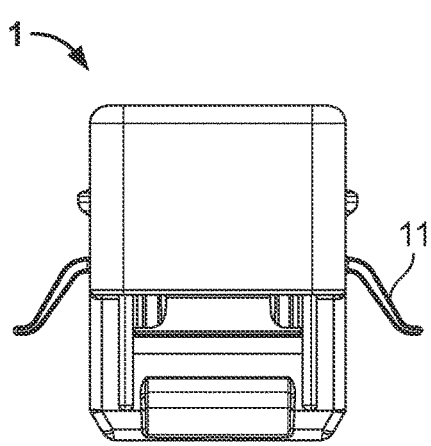
Figure 21:
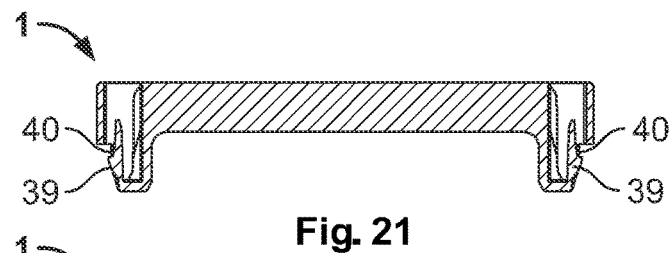
Figure 22:
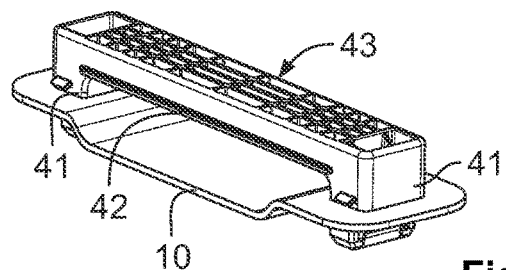
Figure 23:
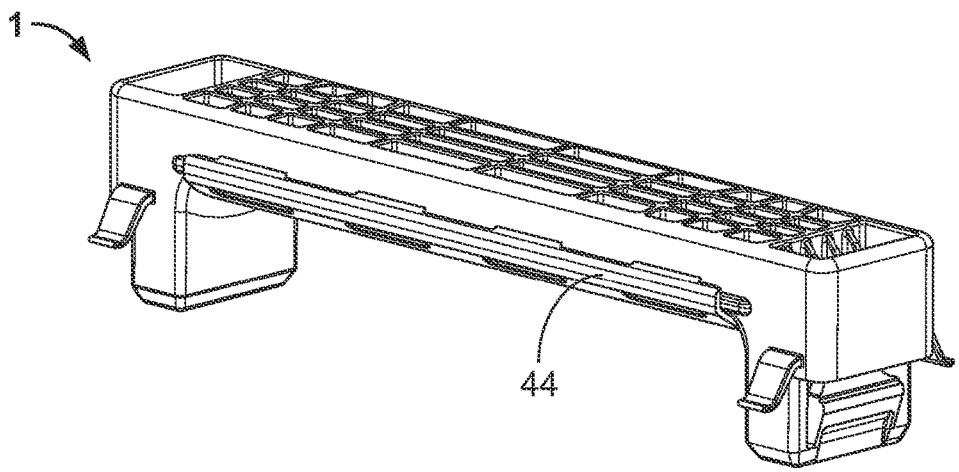
Figure 24:
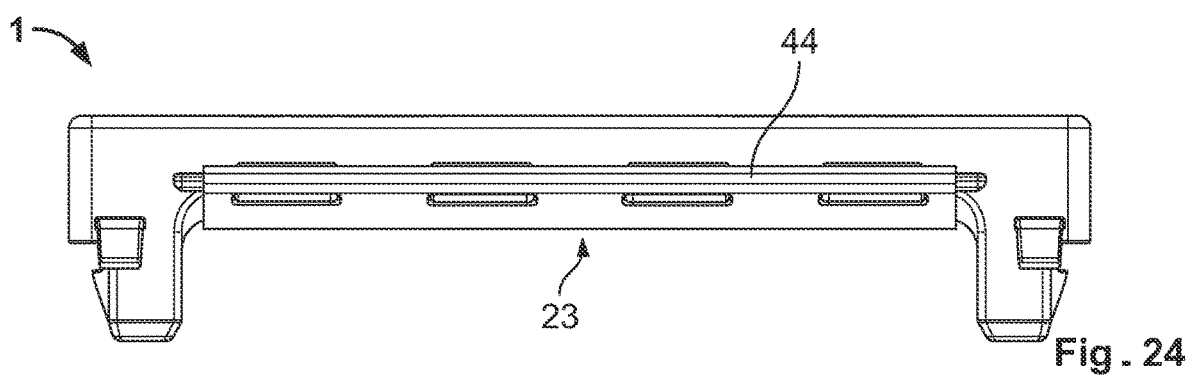
Figure 25:
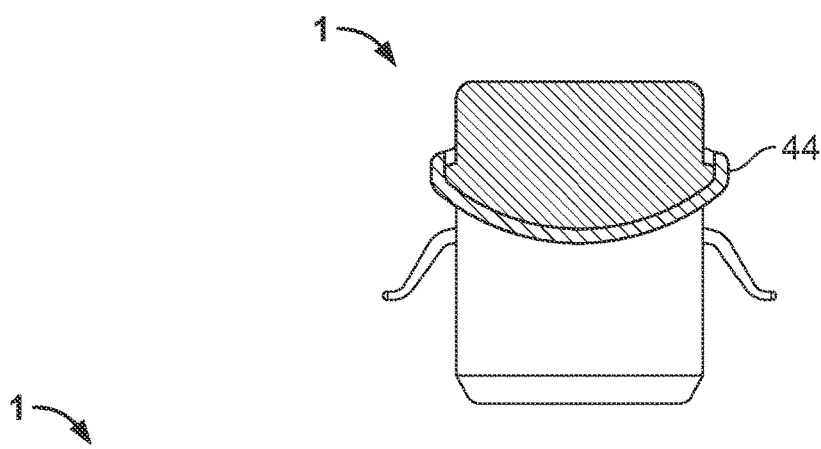
Figure 26:
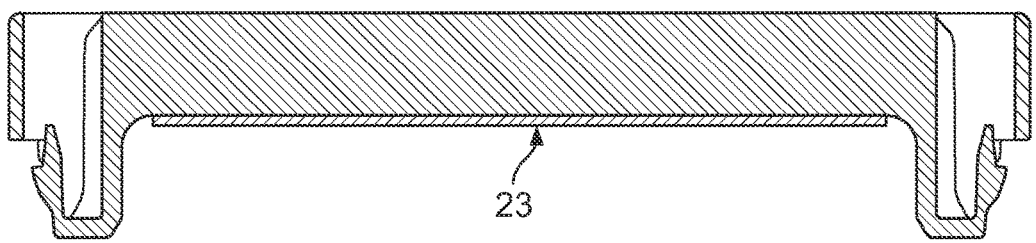

In the following, a plurality of embodiments of a seat belt guide device 1 according to the invention for a passenger restraint belt of a motor vehicle are described based on a plurality of exemplary embodiments.

According to a first exemplary embodiment of a first embodiment of the seat belt guide device 1, the seat belt guide device 1 comprises a base body 2 (FIGS. 1 to 6).

The base body 2 comprises two opposing side walls 3, 4, two opposing end walls 5, 6, a top wall 7 and a mounting wall 8 opposite the top wall 7.

The mounting wall 8 faces in an assembly direction 9. In the context of the present invention, the assembly direction 9 is understood to mean a direction in which the seat belt guide device is attachable to a carrier component 10, wherein the assembly direction extends orthogonally to a corresponding surface of the carrier component 10 to which the seat belt guide device 1 is to be attached.

Spring elements 11 are integrally formed on the end walls 5, 6 in order to exert a force acting in a direction opposite to the assembly direction 9 on the seat belt guide device in a state assembled on a carrier component (final assembly position 54). The spring elements 11 are integrally formed on the end walls 5, 6 in the area of the mounting wall 8 and extend approximately orthogonally outwards in relation to the assembly direction.

Furthermore, a fastening device 12 extending in the assembly direction 9 is integrally formed on the mounting wall 8.

The fastening device 12 comprises a fastening body 13 that is approximately rectangular in cross-section. The fastening body 13 is preferably formed as a positioning and/or anti-rotation device. Due to the approximately rectangular cross-section of the fastening body, an anti-rotation feature can be formed by a mounting recess or a through opening 41 of a carrier component formed corresponding to the rectangular cross-section of the fastening body.

On the fastening body 13, a first and a second catching device 14, 15 are respectively formed on each end wall 5, 6. The first catching device 14 and the second catching device 15 each comprise a first 16, 18 and a second catching element 17, 19, which have corresponding catching edges 20 for engaging behind a through-opening 41 of a carrier component 10. To engage behind a through-opening 41 of a carrier component 10, the catching elements 16 to 19 are formed resilient.

The side walls 3, 4, the end walls 5, 6, the top wall 7 and the mounting wall 8 limit a guide recess 21 for guiding a passenger restraint belt (not shown) and thus form a guide device 22.

The guide recess 21 is formed approximately convex in the area of the mounting wall 8.

In the area of the top wall 7, the guide recess forms a convex guide surface 23.

A pocket-shaped fabricated recess 24 that extends orthogonally in relation to the assembly direction 9 and extends from the side wall 3 to the side wall 4, is provided approximately centered in the guide surface 23. The fabricated recess 24 is thus formed as a recess or a pocket or a groove in the area of the smallest cross-section of the guide recess.

According to the first exemplary embodiment of the first embodiment, the guide recess 21 is formed approximately as a closed ring by the side walls 3, 4, the end walls 5, 6, the top wall 7 and the mounting wall 8.

The seat belt guide device 1 according to the invention is made of plastic by means of, or using, an injection molding method. By providing a corresponding fabricated recess, damage to the guide surface and the associated formation of burrs is securely and reliably prevented when using slide tools during the injection molding process.

In this way, there is no damage to a corresponding passenger restraint belt when using the seat belt guide device 1 according to the invention.

In the following, the seat belt guide device 1 according to the invention is described based on a second exemplary embodiment according to the first embodiment (FIGS. 7 to 17). Unless otherwise described, the second exemplary embodiment of the seat belt guide device 1 according to the invention has the same technical features as the first exemplary embodiment of the seat belt guide device 1. The same components are provided with the same reference symbols.

The seat belt guide device 1 according to the second exemplary embodiment differs from the seat belt guide device 1 according to the first exemplary embodiment in that the seat belt guide device 1 is formed from a first and a second part 26, 27, which can be mated or pushed together via connection structures 25.

The first part 26 and the second part 27 of the seat belt guide device 1 are preferably formed identically or self-complementary. The same applies to the connection structures 25.

The first part 26 and the second part 27 are interconnected via a connection region 28.

In the present exemplary embodiment, the connection structures 25 in a connection wall 29 comprise three catching devices 30, 31, 32 extending perpendicularly or orthogonally from the connection wall 29, which can be arranged in catching recesses 33, 34, 35, which are correspondingly formed to receive the catching devices 30, 31, 32. The catching recesses 33, 34, 35 are also formed in the connection wall 29 due to the self-complementary configuration of the first part 26 and the second part 27 of the seat belt guide device.

According to this exemplary embodiment, the first plate-shaped catching device 30 is provided in the area of the fastening body 13, wherein the catching recess 33 is correspondingly also formed to receive the first catching device 30 in the fastening body.

Furthermore, the area of the mounting wall 8 includes the second catching device 31, which is approximately L-shaped and can be arranged in the correspondingly formed catching recess 34, which is also formed in the area of the bottom wall of the mounting wall 8.

In the area of the top wall 7, the third catching device 32 is provided, which extends vertically from the connection wall 29 and is also formed approximately L-shaped, wherein the corresponding third catching recess 35 is formed in the area of the top wall 7, which is additionally provided as a resilient locking arm 36 with a corresponding catching edge 37 for engaging behind the L-shaped third catching device 32.

To form the seat belt guide device 1, the first part 26 and the second part 27 are placed on top of one another in the area of the connection walls 29 such that the catching devices 30, 31, 32 are arranged in the area of the corresponding catching recess 33, 34, 35 and are connectable to one another by an orthogonal displacement in relation to the assembly direction.

The second exemplary embodiment of the first embodiment specifies that a clearance 38 that terminates into the guide recess 21 is provided in the area of the fastening body, such that the guide recess is approximately C-shaped. A passenger restraint belt is insertable into the guide recess via the clearance 38.

The second exemplary embodiment in particular specifies that the edges in the area of the connection wall 29 of the first and the second part 26, 27 are rounded or chamfered in the mated or pushed together state, in particular in the area of the guide surface 23, such that a fabricated recess 24 is provided in the area of the guide surface.

The fastening device 12 according to the first exemplary embodiment or the second exemplary embodiment according to the first embodiment can comprise an assembly verification device, similar to that described in PCT/US2020/054367 and PCT/US2020/054662, to which full reference is hereby made.

Further suitable exemplary embodiments of assembly verification devices for these two exemplary embodiments will be described in further detail hereinafter on the basis of the further embodiments of the seat belt guide device 1 according to the invention.

In the following, a fastening device according to the invention is described in more detail using a third exemplary embodiment according to a second embodiment (FIGS. 18 to 26). Unless otherwise described, the seat belt guide device 1 according to the third exemplary embodiment comprises the same technical features as the seat belt guide devices 1 discussed above.

The seat belt guide device 1 according to the third exemplary embodiment also comprises a base body 2 with two side walls 3, 4, two end walls 5, 6 and a top wall 7, which outline a guide recess 21 and thereby form a guide device 22.

According to this exemplary embodiment, the mounting wall 8 is divided into two parts and is only provided in the area of the side walls 3, 4, such that the base body is approximately C-shaped.

The fastening device 12 is provided in the area of the side walls 3, 4 and comprises respectively only one catching element 39 with a corresponding catching edge 40 to engage behind through openings 41 of a carrier component 10.

The guide recess 21 is formed convex in the area of the top wall 7.

Furthermore, retaining edges 42, 43 extending parallel to the top wall 7 for fixing a guide surface device 44 are integrally formed on the end walls 5, 6 in the area of the top wall 7.

If such a guide surface device 44 is provided, it forms the guide surface 23.

The guide surface device 44 is integrally formed as a groove or as a half-shell and has curved retaining elements 45 on its lateral longitudinal edges facing the base body 2 for connecting the guide surface device 44 to the corresponding retaining edges 42, 43.

In the following, a seat belt guide device 1 according to the invention is described according to a fourth exemplary embodiment of the second embodiment (FIGS. 27 to 32). Unless otherwise described, this seat belt guide device 1 has the same technical features as the seat belt guide devices 1 shown above.

The seat belt guide device 1 according to the fourth exemplary embodiment substantially corresponds to the seat belt guide device according to the third exemplary embodiment.

The seat belt guide device 1 also comprises an assembly verification device 46.

The assembly verification device 46 ensures that the seat belt guide device 1 can be securely and reliably assembled to a carrier component 10 of a motor vehicle, in particular to a B pillar, via the fastening device 12. Accordingly, the fastening state is easily and reliably detectable via the assembly verification device 46.

The assembly verification device 46 includes a pin device 47 arranged in a corresponding receiving space 48 in the area of the side walls 3, 4 of the base body 2.

The pin device 47, which is slidably supported in the assembly direction 9 in the receiving space 48, has release elements 49 which extend towards the end walls 5, 6 and are integrally formed via corresponding spring sections 50.

The release elements 49 rest in a home position 51 in corresponding release recesses 52 formed in the end walls 5, 6 and extend through said release recesses 52.

The seat belt guide device 1 is firstly arranged in a through-opening 41 of a carrier component 10.

In order to assemble the seat belt guide device 1 in a through-opening 41 of a carrier component 10, a force acting in the assembly direction is preferably exerted manually or by hand on the top wall 7 until the catching elements 39 engage behind an edge of a through-opening 41.

During the movement of the seat belt guide device in the assembly direction 9 in the direction of the carrier component 10, the release elements 49 contact the edge of the through-opening 41 and are thereby pressed into the receiving space 48 by the spring section 50 to which the release elements 49 are connected to the pin device 47.

The release elements 49 are in this case arranged in the assembly direction 9 offset in relation to the catching edges 40 of the catching elements 39 such that the catching elements only remain in the receiving space 48 when the catching edges 40 of the catching elements 39 have engaged behind an edge of the through-openings 41 and the seat belt guide device 1 is thus securely fixed to the carrier component 10.

Because the release elements 49 of the pin device 47 no longer rest on a surface of a carrier component in the area of the through-opening 41—but rather depending on the configuration of the release elements 49—were displaced into the receiving space either by contacting the surface of the carrier component 10 in the area of the through-opening 41 or by contacting the edge of the through-opening 41, the pin device can now be moved into the receiving space 48 in the assembly direction 9 in order to verify a secure assembly of the belt guide direction.

Once a verification surface 53 makes preferably flush contact to the top wall 7 of the base body, it is ensured that the seat belt guide device is securely and reliably connected to a carrier component by means of the fastening device. Thus, the verification surface 53 in conjunction with the pin device 47 provides haptic and/or visual feedback about an assembly state.

According to all exemplary embodiments, the assembly verification device 46 can thus be formed in accordance with its structural design and by its arrangement in assembly direction 9 with regard to the fastening device 12 or the corresponding catching elements 16 to 20, 39 such that the pin device cannot be pressed or cannot be moved into the receiving space 48 in the assembly direction 9 as long as the catching elements 16 to 20, 39 of the fastening device 12 are correctly engaged behind an edge of the through-opening 41 and/or the mounting wall 8 does not rest fully on a surface of the carrier component 10 or is arranged fully in a corresponding through-opening of the carrier component. Preferably, a release element 49 abuts a surface of a carrier component 10 to prevent displacement of the pin device 47 in the assembly direction. The same applies to a displacement or release of a release element. It is also provided in this context that the release element 47 is actuated by the surface of a carrier component. This is shown in particular in the exemplary embodiments of the assembly verification device shown in FIGS. 33 to 37. In addition and/or alternatively, an edge of the through-opening 41 of the carrier component, as shown in the present exemplary embodiment, can also be provided for this purpose.

That is to say, once the release element contacts a surface or edge in the area of the component opening and displaced in the assembly direction 9, the release elements 49 are actuated such that the pin device 47 is released and can be displaced into the receiving space in the assembly direction 9. It can be provided in this case that the release elements 49 that prevent a displacement of the pin device 47 can be moved or displaced either inwardly into the receiving space 48 or outwardly of the receiving space 48. In this way, the path for the pin or pin device is released when the catching elements of the fastening device have securely fixed the seat belt guide device.

In the following, a seat belt guide device 1 is described according to a fifth exemplary embodiment according to the second embodiment (FIGS. 33 to 37). Unless otherwise described, this seat belt guide device 1 has the same technical features as the seat belt guide devices shown above.

The base body 2 of the seat belt guide device 1 comprises the side walls 3, 4, the end walls 5, 6 and the top wall, wherein the mounting wall 8 is again only formed in the area of the side walls 3, 4.

Corresponding spring elements 11 are integrally formed on the end walls in the area of the side walls 3, 4.

In the area of the guide recess 21, a guide surface 23 is provided on the top wall 7, so that a guide device 22 is also formed here.

The seat belt guide device 1 according to this exemplary embodiment can comprise a fastening device 12, which is also provided with an assembly verification device 46.

The assembly verification device 46 is arranged in the area of the side walls 3, 4 or forms the latter (FIGS. 38 to 39).

The pin device 47 is again arranged in a corresponding receiving space 48 and is slidable in the assembly direction 9.

In the area of the mounting wall 8 or of a corresponding mounting wall section, a release element 49 is arranged that is supported in an articulating manner in the area of the side walls 3, 4 and comprises a blocking element 55 extending into the receiving space 48.

The seat belt guide device is mounted in a through-opening 41 of a carrier component 10 by exerting a force on the seat belt guide device acting in the assembly direction 9 in the area of the top wall 7.

It is in this case specified that while the catching edges 40 of the corresponding catching elements 39 engage behind an edge of the through-opening 41, the release element is displaced by the surface of the carrier component 10 in the area of the through-opening 41 in a direction opposite to the assembly direction 9 such that the blocking element connected to the release element 49 releases the receiving space 48 as soon as the catching edges 40 of the catching elements 39 of the fastening device 12 have fully engaged behind the through-opening 41.

A deadstop element 56 can be formed on the pin device 47 to contact the blocking element 55 (FIGS. 41 to 44).

According to this exemplary embodiment, the release element 49 is actuated by a surface of a carrier component.

By means of a corresponding verification surface 53 arranged in the area of the top wall 7, the assembly position or final assembly position 54 of the seat belt guide device can be visually and/or haptically indicated or detected.

Alternatively, it can also be provided in this case that the release element 49 of the assembly verification device 46 is arranged in the area of the receiving space 48 (FIGS. 45 to 48). It is then provided that a side wall section of the side wall 3, 4 has a recess 57 at least in the area of the release element 49. Furthermore, a through-opening 41 of a carrier component must extend in the area of this recess 57 with a horizontal section 58.

The operation principle is analogous to the exemplary embodiment shown above, wherein it is now provided that the release element 49 is displaced into the receiving space 48 by contact with the horizontal section 58 of the carrier component such that the deadstop element 56 releases the pin device.

Once the catching edges 40 of the catching elements 39 engage behind an edge of the through-opening 41 of a carrier component, the pin device can be displaced in the assembly direction such that the verification surface 53 provides haptic and/or visual feedback that the final assembly position 54 has been reached.

Accordingly, only when the catching devices of the fastening device correctly and completely engage behind an edge of a through-opening of a carrier component can the pin device be brought into a final assembly position, thus verifying that the seat belt guide device is correctly assembled on a carrier component.

The basic functions of the verification device can be summarized as follows:

A seat belt guide device according to an exemplary embodiment and its technical features are shown in FIGS. 27 to 32.

A seat belt guide device according to three further exemplary embodiments, including its technical features, is shown in FIGS. 38 to 48.

The seat belt guide device according to a second exemplary embodiment is in particular characterized in that:

1. an assembly of the seat belt guide device is not carried out by a verification pin or a pin device of an assembly verification device, but rather e.g. By exerting a force onto the housing of the seat belt guide device and/or a guide device in an assembly direction;

2. During assembly, no force transfer occurs onto a verification pin or onto flexible locking arms of the bottom part of a fastening device of the seat belt guide device;

3. The verification pin cannot be mounted because it is abutting a rigid housing;

4. Activation/compression of the arms or release elements of the verification pin directly by contacting a surface of the bracket of the carrier component;

5. The verification pin or its release elements thus make contact with the edge of the bracket;

6. Not the catching device of a bottom part but instead separate release arms or release elements release the path for pushing through the verification pin.

FIGS. 27 to 32 show a seat belt guide device comprising a crossmember or a guide device and two fastening devices with corresponding assembly verification devices.

Corresponding pin devices (pins) of the fastening device are arranged or fastened in a preassembly position in a base body (carrier).

The fastening device comprises catching elements (snap hooks) for mounting on a carrier component.

Figure 31:
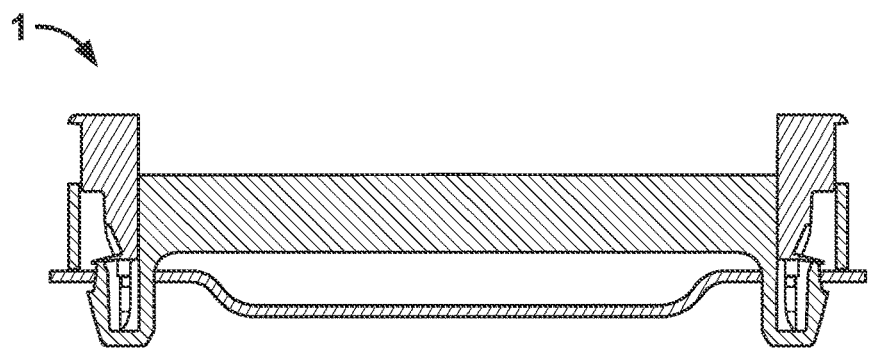
Figure 32:
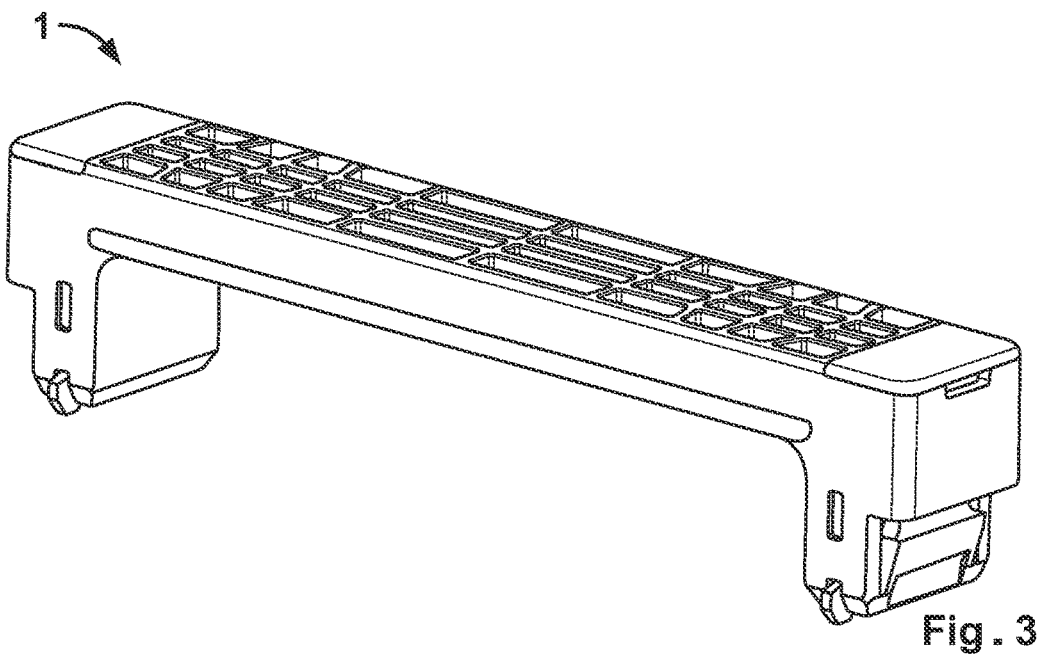
Figure 33:
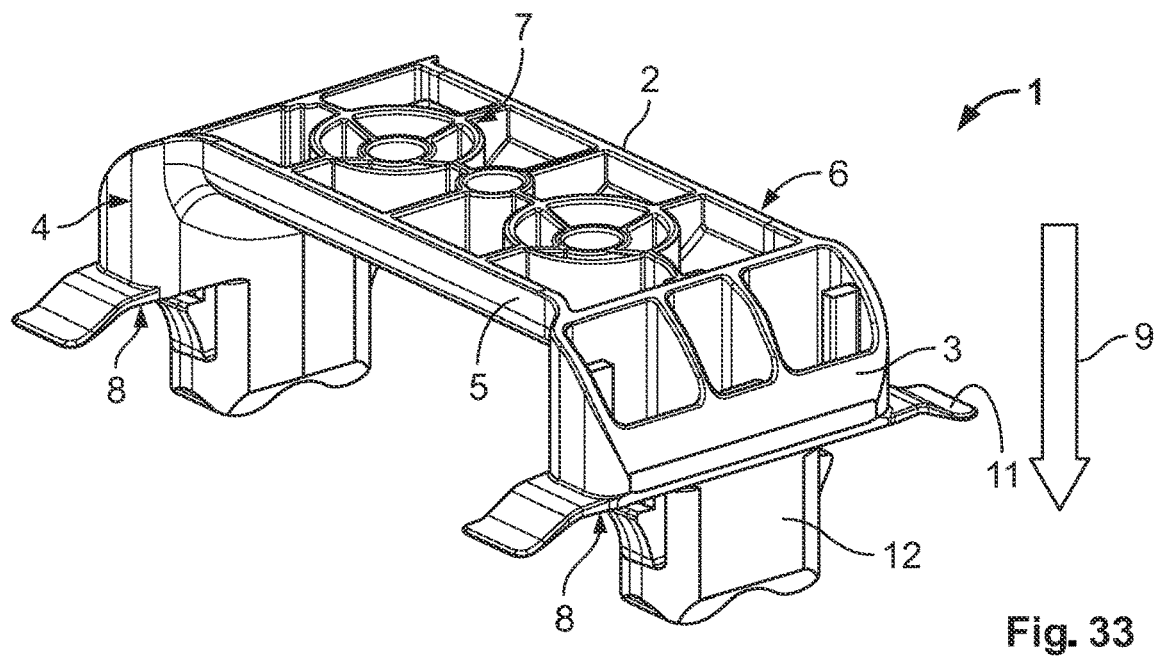
Figure 34:
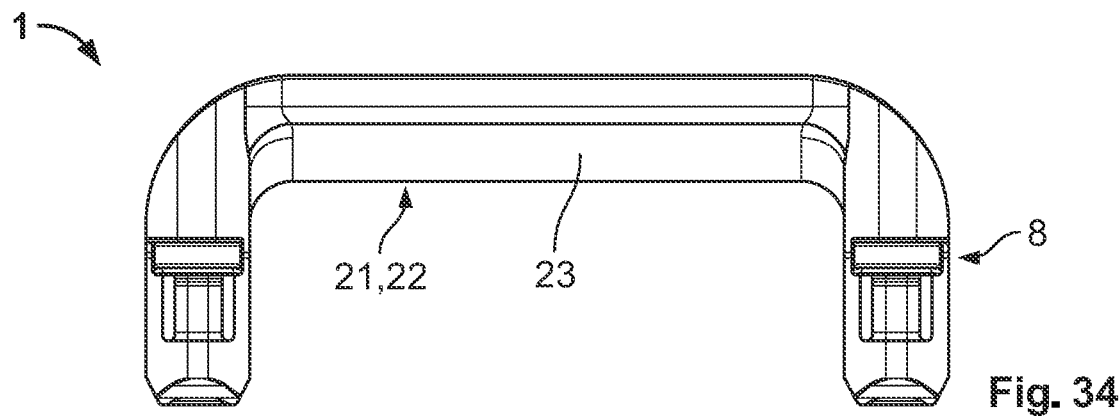
Figure 35:
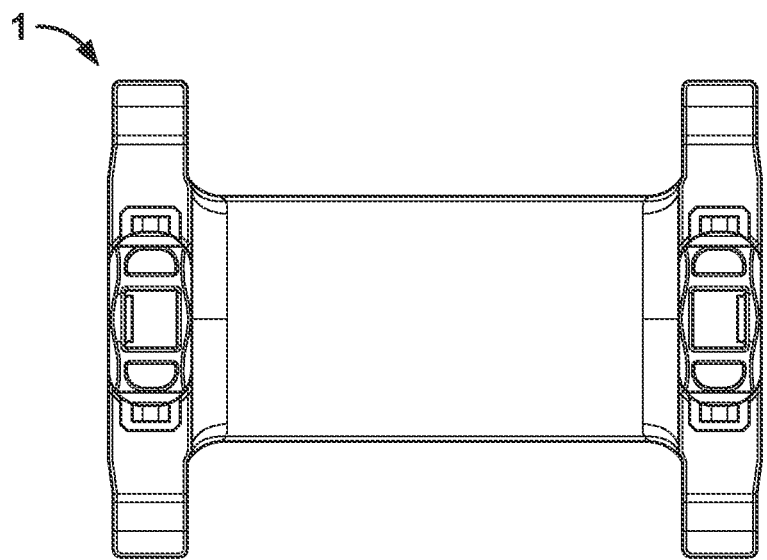
Figure 36:
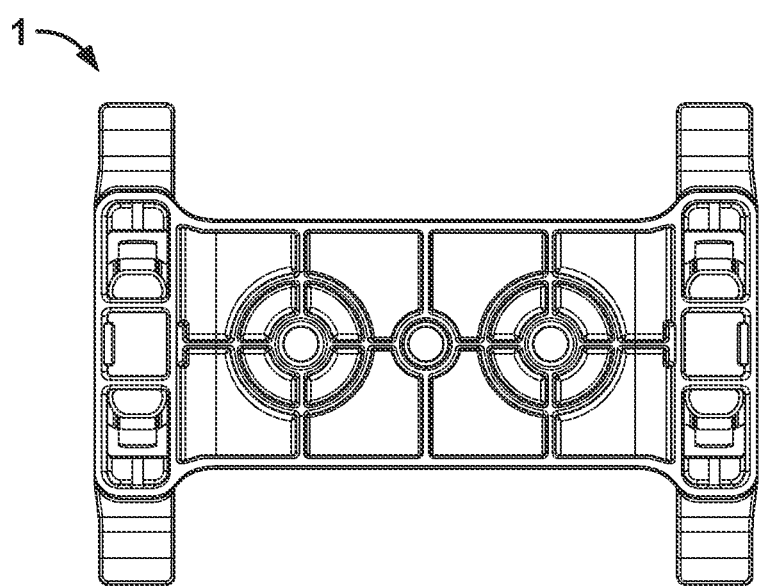
Figure 41:
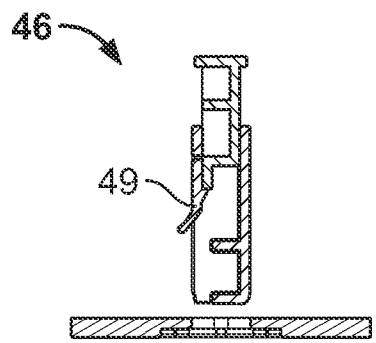
Figure 42:
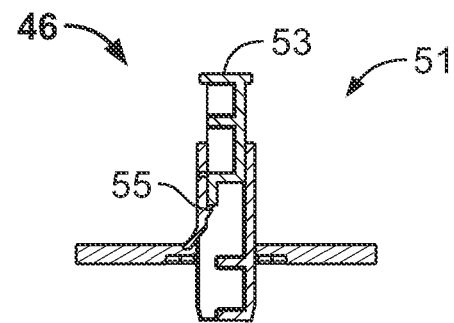
Figure 43:
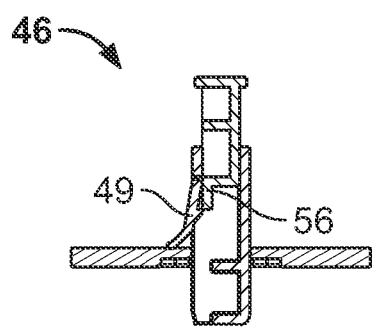
Figure 44:
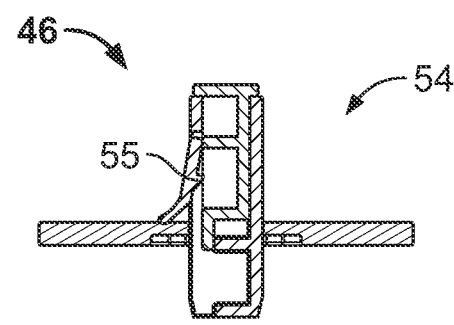
Figure 45:
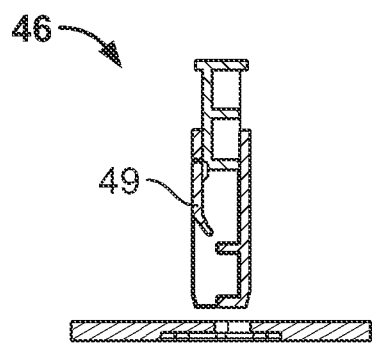
Figure 46:
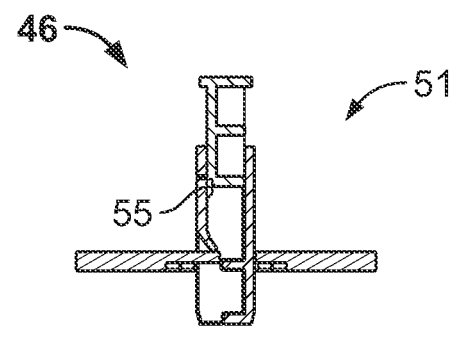
Figure 47:
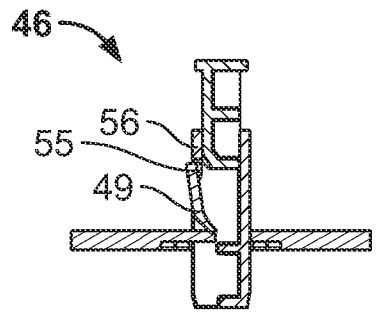
Figure 48:
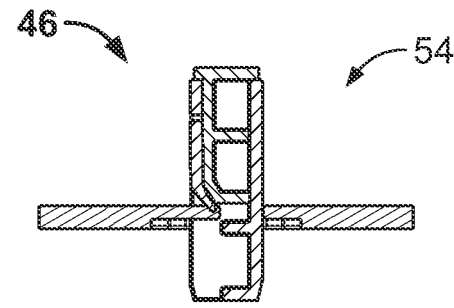

FIG. 31 shows the seat belt guide device in a preassembly position according to the second exemplary embodiment.

In this state, spring elements on the pin device prevent pushing through the pin apparatus in the assembly direction.

The pin device can only be pushed in the assembly direction when the catching elements of the fastening device are fully engaged and have reached their end position in the carrier component.

This ensures that the seat belt guide device is securely and reliably assembled when the pin device (pin) can be pushed into its end position.

The seat belt guide device is mounted vertically into the bracket via the fastening devices, and the catch elements (snap hooks) of the fastening device fasten the seat belt guide device to the bracket.

Once the end position has been reached, the spring elements of the pin device are actuated or moved inward by the edge of the bracket, allowing movement of the pin device in the assembly direction (downwards).

If the catching element (snap hook) of the fastening device is not fully engaged behind, the pin device is blocked along the top and cannot be pushed in the assembly direction. The assembled position is thus verified twice. Only if both criteria are met can the pin device be pushed into its end position In the final assembly position, the spring elements of the pin device (pins) engage into the fastening device with recesses provided for this purpose.

In the assembled position, the pin device pushes the catching element (snap foot) against the bracket and thus increases the restraining force.

For disassembly, the pin device can be levered upwards, for example with a screwdriver, in a direction opposite to the assembly direction.

The pin device (pin) is formed integrally or as one piece. A compression surface and "verification arms" are provided on one part.

"Verification arms" and locking elements (catching elements) of the bottom part are arranged offset by 90° transversely to the assembly direction.

This has the effect of ruling out that they touch each other or negatively influence each other during assembly.

In the assembled position, the pin device exerts the pressure on the catching element (snap foot) and thus increases the restraining force.

A sliding surface is provided on an area of the pin device opposite the assembly direction.

A further seat belt guide device with two fastening devices according to three further exemplary embodiments is shown in FIGS. 38 to 48.

These also show a two-part fastening system for verifying a defined assembly sequence and for ensuring correct assembly or for preventing incorrect assembly (assembly verification device).

The system includes a fastener element and a preassembled locking pin or a pin device.

The pin device can only be inserted when an injection-molded lever arm of the fastener element comes into contact with a surface of a carrier component.

The bracket of the carrier component thus causes the release for a locking pin of the pin device. After successful assembly, the locking pin locks the snap feet (catching elements) of the fastening device (connecting element) and thus additionally increases the restraining force of the component, in particular the seat belt guide device.

LIST OF REFERENCE SYMBOLS

1 Seat belt guide device
2 Base body
3 Side wall
4 Side wall
5 End wall
6 End wall
7 Top wall
8 Mounting wall
9 Assembly direction
10 Carrier component
11 Spring element
12 Fastening device
13 Fastening body
14 First catching device
15 Second catching device
16 First catching element
17 Second catching element
18 First catching element
19 Second catching element
20 Catching edge
21 Guide recess
22 Guide device
23 Guide surface
24 Fabricated recess 25 Connection structure
26 First section
27 Second section
28 Connection region
29 Connection wall
30 Catching device
31 Catching device
32 Catching device
33 Catching recess
34 Catching recess
35 Catching recess
36 Locking arm
37 Catching edge
38 Clearance
39 Catching element
40 Catching edge
41 Through-opening
42 Retaining edge
43 Retaining edge
44 Guide surface device
45 Retaining elements
46 Assembly verification device
47 Pin device
48 Receiving space
49 Release element
50 Spring section
51 Home position
52 Release recess
53 Verification surface
54 Final assembly position
55 Blocking element
56 Deadstop element
57 Recess
58 Horizontal section

What is claimed is:

1. A seat belt guide device for a passenger restraint belt of a motor vehicle, wherein the seat belt guide device comprises a fastening device with at least a first catching device, with which the seat belt guide device can be attached to a motor vehicle in an assembly direction, wherein the seat belt guide device comprises a guide device with a guide recess for guiding a passenger restraint belt, wherein a width of the guide recess corresponds to at least a width of a passenger restraint belt, and wherein the seat belt guide device is injection molded from a plastic;
wherein the seat belt guide device comprises spring elements for exerting a force on the seat belt guide device in the assembled state that acts in a direction opposite to the assembly direction.

2. The seat belt guide device according to claim 1, wherein
the fastening device comprises a second catching device, wherein the first and the second catching device and the guide device are arranged one behind the other in the assembly direction and at least partially overlapping each other in a direction orthogonal to the assembly direction.

3. The seat belt guide device according to claim 1, wherein
the guide device comprises a guide surface that outlines the guide recess and on which a passenger restraint belt is slidably supported or guided, wherein a fabricated recess is formed in the guide surface that extends parallel to the width of the guide recess.

4. The seat belt guide device according to claim 1, wherein
the guide recess of the guide device is formed as a closed ring.

5. The seat belt guide device according to claim 2 wherein
a clearance terminating into the guide recess of the guide device is formed between the first catching device and the second catching device, through which a passenger restraint belt can be inserted into the guide recess via a longitudinal edge of a passenger restraint belt.

6. The seat belt guide device according to claim 1 wherein
the seat belt guide device is formed integrally.

7. The seat belt guide device according to claim 1, wherein
the seat belt guide device is formed from two parts that can be mated or pushed together via connection structures, wherein said first and second parts are identical and have self-complementary connection structures or have correspondingly formed connection structures.

8. The seat belt guide device according to claim 7, wherein
edges of the first and the second parts in a connection region of the two parts where they contact each other in the mated or pushed together state are formed rounded or chamfered.

9. The seat belt guide device according to claim 1 wherein
the fastening device comprises an assembly verification device.

10. A seat belt guide device for a passenger restraint belt of a motor vehicle, wherein the seat belt guide device comprises a fastening device with at least a first catching device, with which the seat belt guide device can be attached to a motor vehicle in an assembly direction, wherein the seat belt guide device comprises a guide device with a guide recess for guiding a passenger restraint belt, wherein a width of the guide recess corresponds to at least a width of a passenger restraint belt, and wherein the seat belt guide device is injection molded from a plastic;
wherein the fastening device comprises a second catching device, wherein the first and the second catching device and the guide device are arranged one behind the other in the assembly direction and at least partially overlapping each other in a direction orthogonal to the assembly direction.

11. A seat belt guide device for a passenger restraint belt of a motor vehicle, wherein the seat belt guide device comprises a fastening device with at least a first catching device, with which the seat belt guide device can be attached to a motor vehicle in an assembly direction, wherein the seat belt guide device comprises a guide device with a guide recess for guiding a passenger restraint belt, wherein a width of the guide recess corresponds to at least a width of a passenger restraint belt, and wherein the seat belt guide device is injection molded from a plastic;
wherein the guide device comprises a guide surface that outlines the guide recess and on which a passenger restraint belt is slidably supported or guided, wherein a fabricated recess is formed in the guide surface that extends parallel to the width of the guide recess.

* * * * *